April 19, 1938.   H. PAXTON   2,114,724
AUTOMATIC BOX LIDDER
Filed Dec. 10, 1930   5 Sheets-Sheet 1
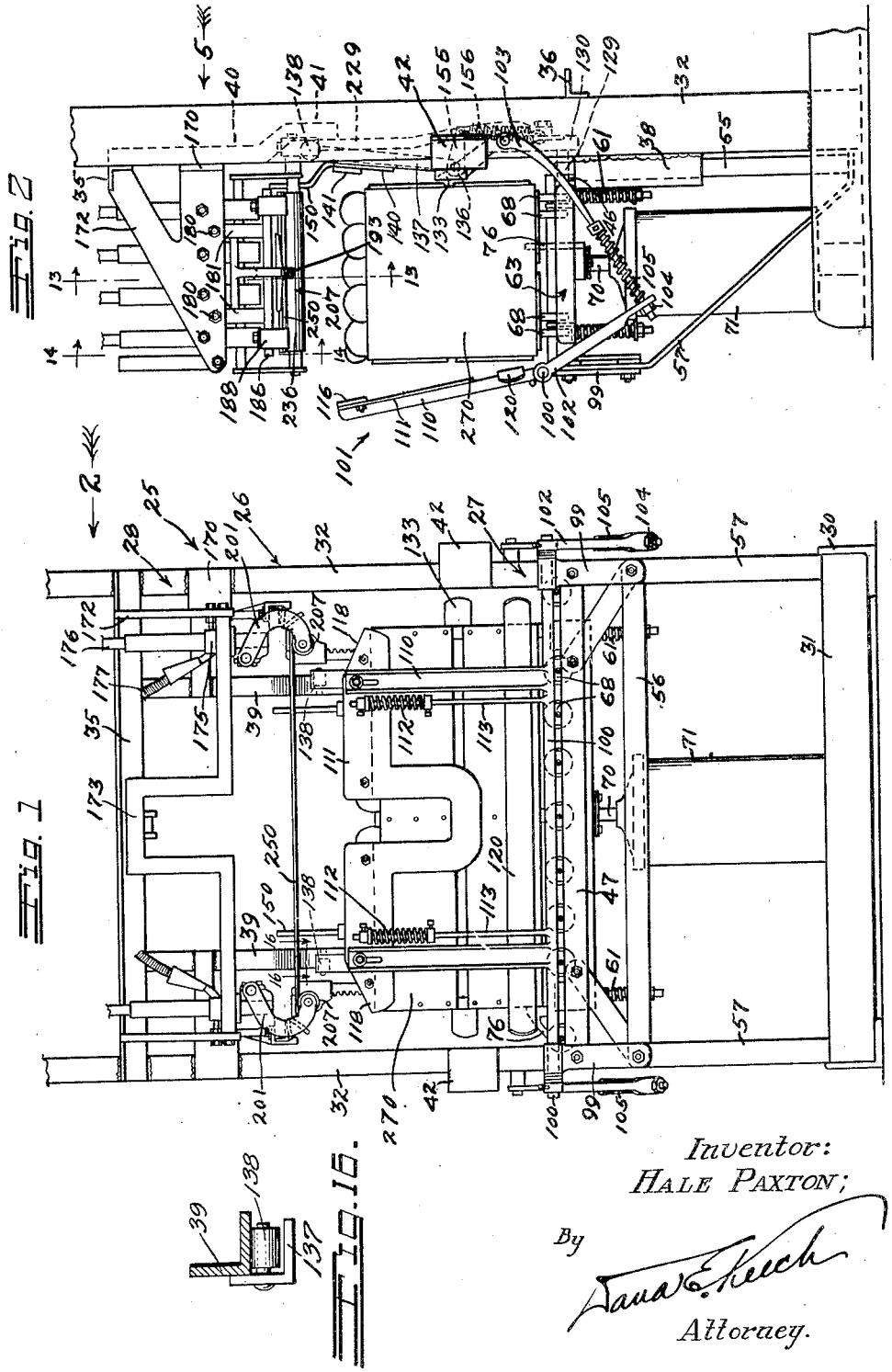
Inventor:
HALE PAXTON;
By
Dana E. Keech
Attorney.

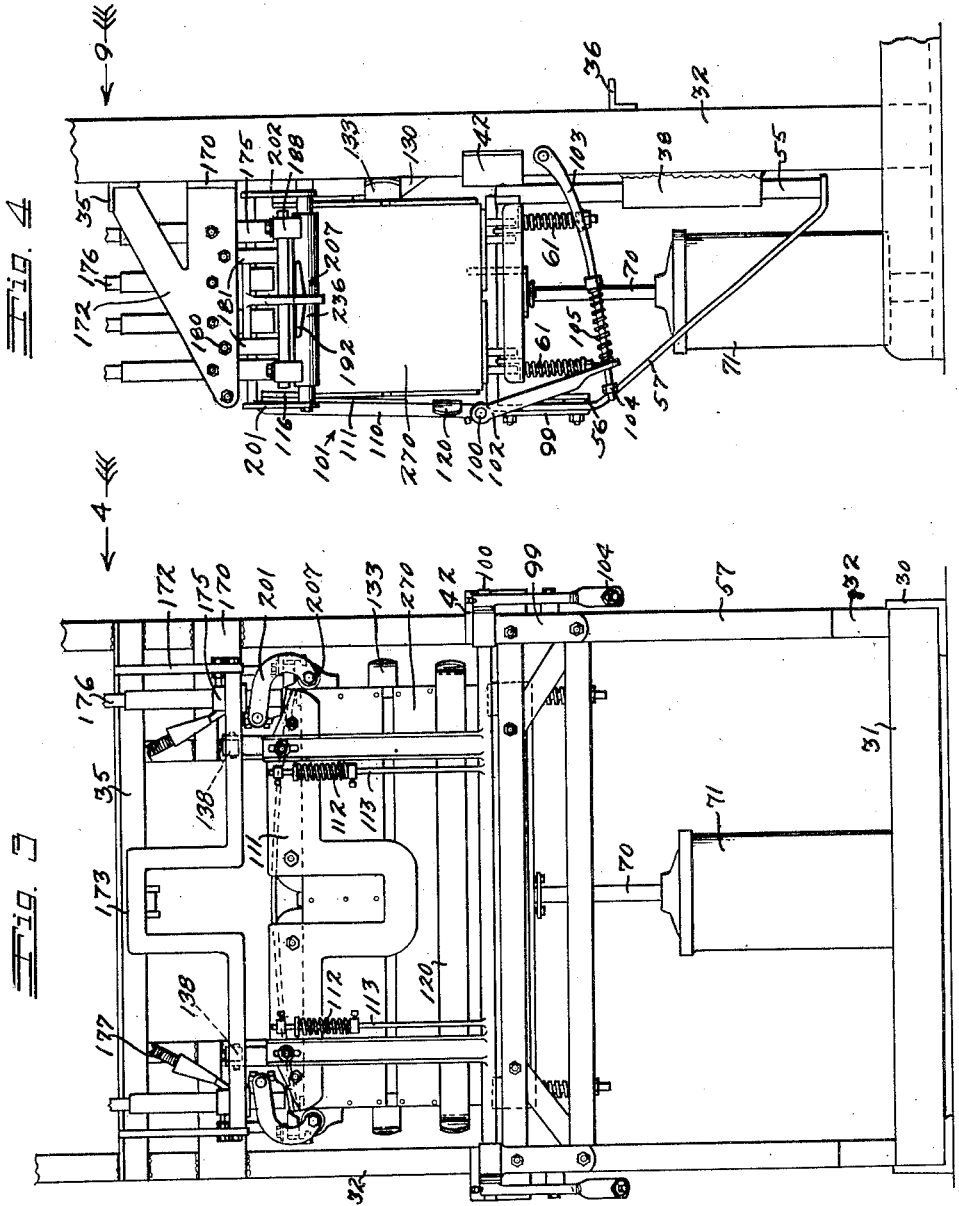

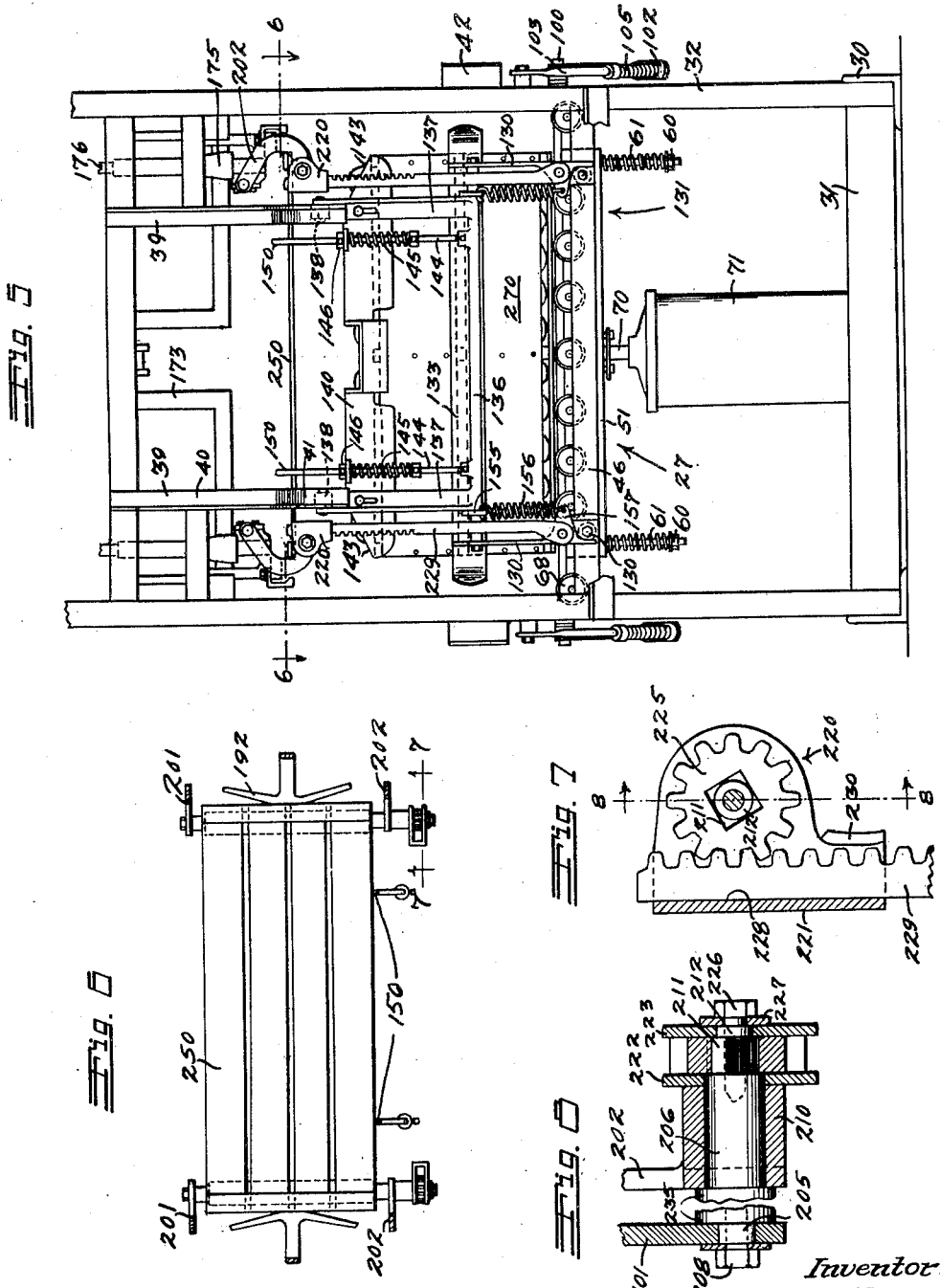

April 19, 1938.　　　　H. PAXTON　　　　2,114,724
AUTOMATIC BOX LIDDER
Filed Dec. 10, 1930　　　5 Sheets-Sheet 4
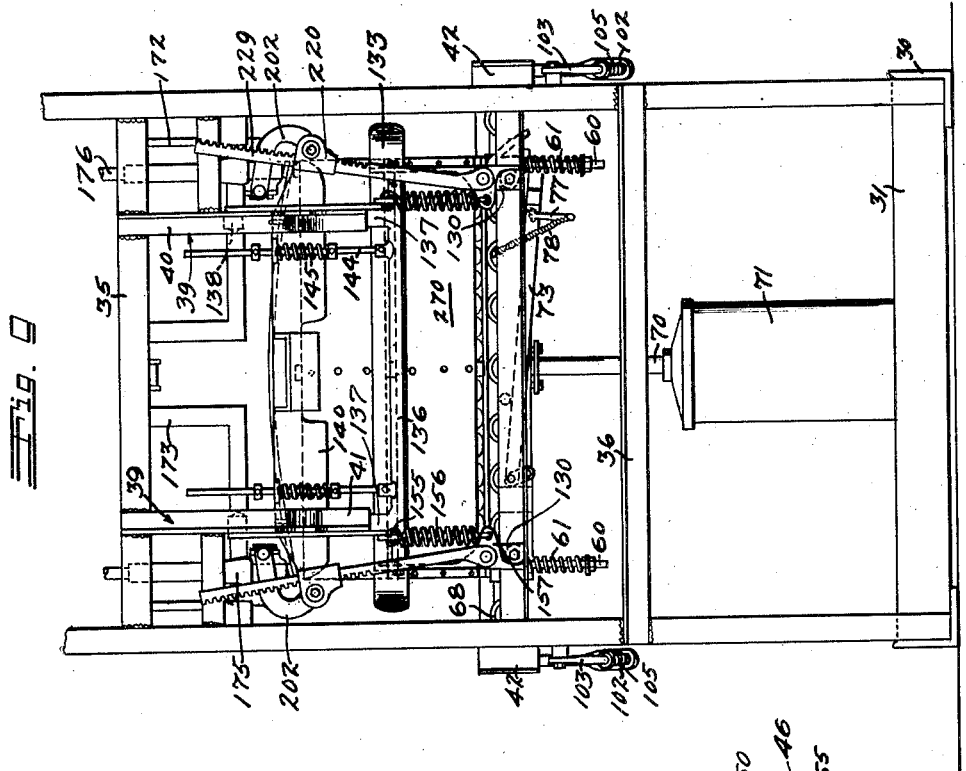
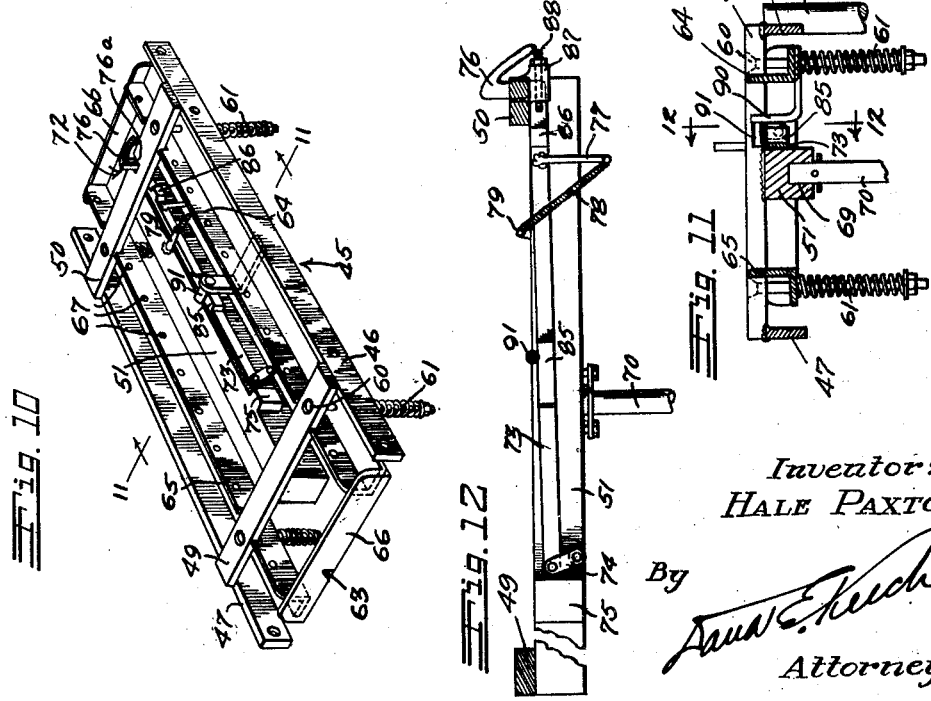
Inventor:
HALE PAXTON;
By
[signature]
Attorney.

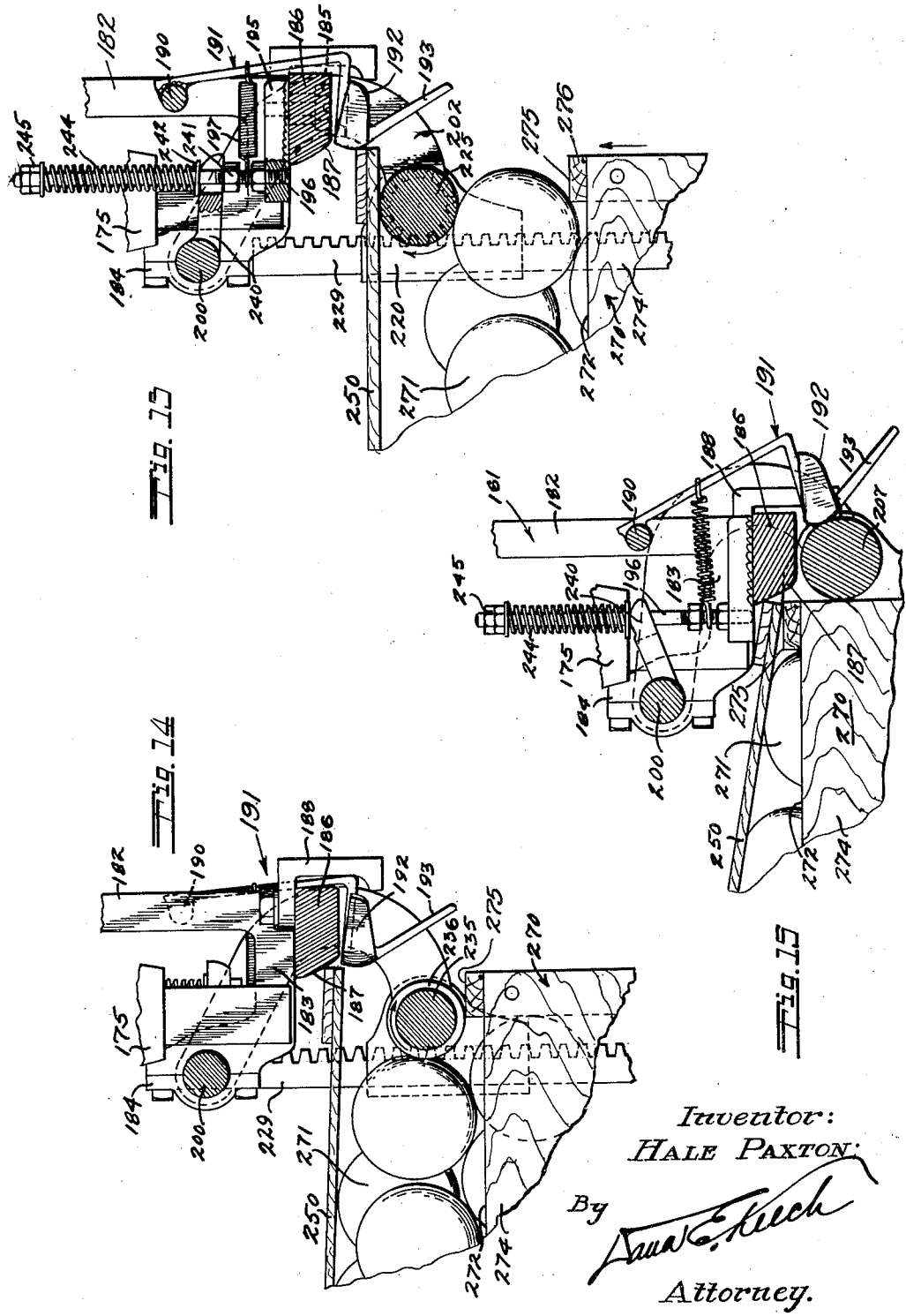

Patented Apr. 19, 1938

2,114,724

UNITED STATES PATENT OFFICE 2,114,724

AUTOMATIC BOX LIDDER

Hale Paxton, Redlands, Calif., assignor, by mesne assignments, to Food Machinery Corporation, a corporation of Delaware Application December 10, 1930, Serial No. 501,285

23 Claims. (Cl. 1—10)

My invention relates to receptacle lidding devices and particularly to shipping case lidding devices.

Large portions of the various crops of fruits and vegetables produced in the United States are sent to the market in wooden cases, generally called boxes, the contents of each box being held therein by a wooden cover or lid nailed to the box.

To accomplish this, lidding machines, either manually or automatically operated, are provided. In these devices it has heretofore been necessary to manually hold a lid in position while the device is operated to apply the lid to a box. This endangers the operator's hands and reduces the possible speed of the device.

It is correspondingly an object of my invention to provide a lidding machine having novel means for mechanically positioning a lid for application to a box by said machine.

Certain crops, such as citrus fruits, are packed with what is known as a "crown pack", that is, the fruit is heaped up above the top of the box so when the lid is applied it will bulge upwardly. Much of the time consumed in lidding crown packed boxes at present is devoted to tucking fruit in at the sides and ends of the box to prevent it being crushed between the lid and the box.

It is an object of my invention to provide a lidding machine having novel means for automatically tucking fruit or the like inwardly between the box and the lid during the lidding operation.

While my invention may be incorporated with many different kinds of lidding devices, it is especially designed for use in an automatic lidding machine.

It is a still further object of my invention to accomplish two or more of the foregoing objects by a single means.

It is also an object of my invention to provide a novel gathering mechanism for gathering fruit or the like inwardly from over an edge of a box incidental to pressing the overflow produce downward into said box, to prevent the pinching of said produce.

The manner in which the foregoing objects are accomplished, as well as further objects and advantages will be made manifest in the following description, taken in connection with the accompanying drawings, in which:

Fig. 1 is a front elevational view of a preferred embodiment of my invention in box receiving position.

Fig. 2 is an end elevation of Fig. 1 taken in the direction of the arrow 2.

Fig. 3 is a view similar to Fig. 1 in box lidding position.

Fig. 4 is a view similar to Fig. 2 taken in the direction of the arrow 4 in Fig. 3.

Fig. 5 is a rear elevational view taken in the direction of the arrow 5 in Fig. 2.

Fig. 6 is a diagrammatic horizontal sectional view taken on the line 6—6 of Fig. 5.

Fig. 7 is an enlarged detail sectional view taken on the line 7—7 of Fig. 6.

Fig. 8 is a vertical sectional view taken on the line 8—8 of Fig. 7.

Fig. 9 is a view similar to Fig. 5 taken in the direction of the arrow 9 in Fig. 4.

Fig. 10 is a diagrammatic perspective view of the box receiving conveyer framework of my invention.

Fig. 11 is a cross sectional view taken on the line 11—11 of Fig. 10.

Fig. 12 is a longitudinal sectional view taken on the line 12—12 of Fig. 11.

Fig. 13 is an enlarged fragmentary detail sectional view taken on the line 13—13 of Fig. 2.

Fig. 14 is a view similar to Fig. 13 taken on the line 14—14 of Fig. 2, illustrating a box in a partially lidded position.

Fig. 15 is a view similar to Fig. 13 taken on the line 13—13 of Fig. 2 and showing the box in lidding position.

Fig. 16 is a detail sectional view taken on the line 16—16 of Fig. 1.

Referring specifically to the drawings, the illustrated embodiment of my invention comprises an automatic box lidder 25 having a frame 26 on which is mounted a box lifting conveyer 27, and on which is fixedly supported a lid applying mechanism 28.

The frame 26 includes angle footing members 30 which are connected by a solid steel bar 31 and from which heavy channel standards 32 extend upwardly and are connected together as by horizontal frame members 35 and 36. Provided on forward faces of the standards 32 are slideways 38. Secured on members 35 and 36 and depending therefrom are rear side tucker tracks 39 having upper vertical portions 40, and lower offset portions 41. Also secured on the standards 32 are box guides 42.

The conveyer

The box receiving conveyer 27 includes a framework 45 having inner and outer longitudinal members 46 and 47 connected rigidly by anvil bars 49 and 50. Rigidly connected to lower surfaces of the anvil bars 49 and 50 is a relatively heavy lifting bar 51. Secured to opposite ends of the longitudinal bar 46 are cylindrical slide shafts 55. Extending downwardly from opposite ends of the bar 47 is a vertical bracing framework 56, opposite side members 57 of which extend downwardly, diagonally, and are connected at their lower ends to the slide shafts 55.

Suspended from the anvil bars 49 and 50 by bolts 60 having compression springs 61 is a depressible roller conveyer frame 63. The frame 63 includes angle iron members 64 and 65 which are connected at their ends by plates 66. The vertical flanges of the angle iron members 64 and 65 are notched out to fit the anvil bars 49 and 50 and are provided with suitable apertures 67 through which bolts may be extended for mounting conveyer rollers 68 thereon.

Secured in an opening 69 at a middle point in the lower surface of the lifting bar 51 is a piston rod 70 of a hydraulic cylinder 71 which is disposed on a vertical axis and rests upon the solid frame cross bar 31.

Box stop mechanism

The box receiving conveyer 27 is provided with a box stop mechanism 72. This mechanism includes a long arm 73 pivotally connected by a link 74 to the lifting bar 51 adjacent a boss 75 formed on the bar. The arm 73 extends along the bar 51 beneath the anvil bar 50 and has a stop 76 formed on its end which extends upwardly through a notch 76a formed in the anvil bar 50. The arm 73 has a downward extending finger 77 from which a tension spring 78 is stretched to a stationary finger 79 provided on the lifting bar 51 so as to maintain the arm 73 and stop 76 positioned as shown in Fig. 12. Formed on the arm 73 are bosses 85 and 86. Rigidly provided on the anvil bar 50 is a boss 87 having a stop screw 88 adjustably mounted therein in a position to be contacted by the boss 86 of the arm 73 when the stop 76 is pulled horizontally to stretch the spring 78. Mounted on the angle iron 64 as shown in Fig. 11 is a bracket 90 having a depressing finger 91 which extends over the boss 85 for a purpose to be described later.

Front side tucker

Journalled in suitable bearings 99 mounted on opposite ends of the stiffening frame 56 is a shaft 100 of a front side fruit tucker 101. The shaft 100 has arms 102 fixed to its opposite ends. Extending through holes in end portions of the arms 102 are end portions of yieldable guide arms 103, the opposite ends of which are pivoted on the standards 32. Coiled about lower portions of the arms 103 and pressing the arms 102 against nuts 104 on arms 103 are compression springs 105. Rigidly mounted on the shaft 100 and extending upwardly therefrom are tucker plate supporting arms 110 on upper ends of which a front side tucker plate 111 is mounted so as to be vertically slidable. Yieldably supporting the plate 111 in its upper position are a pair of springs 112 mounted on rods 113 secured to the shaft 100.

Secured to the tucker plate 111 along its upper edge are face plates 116. Opposite ends 118 of the upper edges of the plates 111 and 116 are beveled as shown in Figs. 1 and 3 for reasons which will become evident hereinafter. Secured to inner faces of the lower portions of the arms 110 is a guide strap 120.

Rear side tucker

Mounted upon the longitudinal conveyer frame bar 46 by spacers 129 are main supporting arms 130 of a rear side tucker 131. Connecting upper ends of the arms 130 is a guide strap 133 and pivotally supported between upper end portions of these arms is a shaft 136 having tucker arms 137 extending upwardly therefrom and carrying rollers 138 which bear against forward faces of the tracks 39. Slidable vertically on the arms 137 is a rear side tucker plate 140 having tucker face plates 141 secured thereto as shown in Fig. 2. Outer portions 143 of the plates 140 and 141 are beveled as shown in Fig. 5, for reasons which will become evident hereinafter. Mounted upon rods 144, extending upwardly from the shaft 136, is a pair of springs 145 which yieldably support the tucker plate 140 in its upper position against collars 146. Upper end portions 150 of the rods 144 extend above the tucker 131 and are bent inwardly and upwardly as shown in Fig. 2. Extending rearwardly from the shaft 136 are short arms 155 which are connected by tension springs 156 to brackets 157 provided on lower portions of the supporting arms 130 the rollers 138 being thus held in contact with the tracks 39.

Lid receiving and applying, and end fruit tucking mechanism

Reinforcing opposite ends of the cross bar 36 are plates 170. Extending upwardly from these plates and connected to the upper cross bar 35 are nailing head supporting plates 172, forward ends of which are spaced by a bar 173 as shown in Figs. 1 and 3. Supported on inner faces of the plates 172 are a series of nailing chucks 175, in each of which is operated one of a series of nailing plungers 176. Nails are fed to the chucks 175 through the usual flexible tubes 177.

Secured against the inner face of each of the plates 172 as by bolts 180 (see Figs. 2 and 14) are tucker bearing supports 181 having vertical portions 182, feet 183 extending inwardly therefrom, and bearings 184 provided on the inner ends of these feet. Adjustably secured to lower faces of the feet 183 as by countersunk cap screws 185 is a lid compressing bar 186, the inner face 187 of which is bevelled as shown in Figs. 13, 14, and 15. Mounted on opposite ends of the bar 186 are tucker stops 188 for a purpose which will be made clear hereinafter. Mounted between and with its ends journalled in the upright portions 182 of tucker supports 181 is a lid guide shaft 190 having a lid guide 191 formed as shown in Figs. 2, 6, 13, and 14. This guide extends downwardly and inwardly beneath the bar 186 to a point beneath the face 187 thereof, and has guide wings 192 and a central leg 193 extending downwardly therefrom. Provided centrally on each bar 186 and extending inwardly therefrom as shown in Fig. 13, is a lug 195 from the inner end of which a rod 196 extends upwardly. Attached at its opposite ends to the rod 196 and the guide 191 is a coil spring 197, which tends to swing the guide into its inwardmost position.

Journalled in the bearings 184 is a shaft 200, to opposite ends of which hook-like arms 201 and 202 are rigidly secured. These arms extend downwardly and have journalled in suitable bearings therein trunnions 205 and 206 of an end tucker roller 207. The trunnion 205 is relatively short and rests in a hole in the lower end of the arm 201 and is secured therein by a cap screw 208 which extends into the end of the roller 207. The trunnion 206 is relatively long and rests in a bearing 210 provided on the lower end of the arm 202, the trunnion 206 having a squared end 211 and a cylindrical nipple 212 extending therebeyond.

Mounted on the rear ends of each roller 207 as shown in Figs. 7 and 8 is a rack and pinion actuating mechanism 220. This mechanism includes a U-shaped shell 221 providing walls 222 and 223 apertured to fit the outer end of the trunnion 206 and the nipple 212 respectively. Disposed between the walls 222 and 223 and fitting the squared roller end 211 is a pinion 225.

Formed in the end of the trunnion 206 is a suitable aperture for threadedly receiving a cap screw 226 which bears against a washer 227 to hold the rack and pinion mechanism 220 in place on the end of the roller.

The shell 221 forms a guideway 228 for receiving a rack 229 which extends downwardly and is pivotally secured to the bracket 157 disposed directly therebelow. Lips 230 may be bent inwardly to assist in guiding the racks 229 along the guideway 228.

End portions 235 of the rollers 207 disposed adjacent to the arms 201 and 202 are of smaller diameter than the middle portion 236 of the roller for a purpose which will be made clear later.

Provided centrally on each shaft 200 extending outwardly therefrom is a short arm 240 bifurcated at its end to receive the rod 196 as shown in Fig. 13. Threadedly adjustable on the rod 196 is a nut 241 upon which the arm 240 is adapted to rest. Disposed about the rod 196 above the arm 240 is a washer 242 which is compressed against the arm by a spring 244, the pressure of which is adjustable as by nuts 245. The spring 244 tends to hold the arms 201 and 202 and the roller 207 disposed therebetween in its downwardmost position as shown in Fig. 13, which is determined by the position of the nut 241 in the rod 196.

The operation of my invention is as follows:

Suitable control means for the hydraulic cylinder 71 is of course provided. At the beginning of operations, the box receiving conveyer 27 is in its downward position as shown in Figs. 1, 2, and 5. This conveyer is adapted to receive a box in this position, the box being stopped thereon by the stop mechanism 72. Power is then applied to the hydraulic cylinder 71 so as to lift the elevator 27 into its uppermost position in which it is shown in Figs. 3, 4, and 9. This accomplishes the applying of a lid to this box and facilitates its being nailed in place. It also accomplishes the tucking of the fruit in at both front and rear sides and both ends of the box so that when the lid is applied none of the fruit is crushed between the box and the lid.

While the elevator 27 is in its lower position a lid 250 is placed between the yieldable lid guides 191 with end portions of the lid resting upon the rollers. This lid may be inserted either manually or mechanically straight inwardly from the front between the arms 201 with ends abutting against wings 192 of the yieldable lid guides 191.

The equal pressure of the lid guides 191 against the lid 250 centers the lid so that its opposite ends are positioned as shown in Fig. 13 directly beneath the bevelled inner faces 187 of the compressing bar 186.

When the lid is thus inserted in the machine it is pushed rearwardly until it comes in contact with upper end portions 150 of the rods 144 which act as rear positioning stops for the lid.

A box 270 is now drawn from a suitable conveyer (not shown) onto the rollers 68 of the conveyer 27. This box is pushed rearwardly against the guide strap 133 and advanced until it engages the stop 76 of the box stop mechanism 72. This carries the arm with the box a short distance stretching the spring 78 until the boss 86 engages the stop screw 88 which stops further travel of the box 270. The box is now properly positioned beneath the lid receiving and applying mechanism for this to properly apply the lid 250 to the box 270. The springs 61 are of such stiffness as to support the box 270 with a load of fruit packed tightly therein as is customary for commercial shipments. In the drawings herein, box 270 is shown as containing a commercial pack of oranges. In this form of pack the upper layer of oranges 271 is disposed above the upper edges 272 of the box 270. The box 270 is a standard orange shipping case, and sides 274 thereof are formed of two slats, the upper edge of each side being disposed slightly below the upper edges 275 of the box ends 276.

As soon as the box 270 is brought to a stop by the stop mechanism 72, the operator of the lidder 25 actuates certain control mechanism (not shown) which pumps a suitable liquid into the lower end of the cylinder 71 so as to move the conveyer 27 upwardly. This lifts the box 270 so that the endmost oranges in the upper tier 271 come in contact with the rollers 207 as shown in Fig. 13. Elevation of the conveyer 27 also elevates the front side tucker 101 and the rear side tucker 131 which causes these to be deflected inwardly by their respective mechanisms into the position in which they are shown in Fig. 4.

This deflection of the front side tucker results, as clearly shown by comparison of Figs. 2 and 4, from the upward swinging of the arm 103 about its stationary pivot on the main frame. The inward deflection of the rear side tucker 141 results from the rollers 138 riding from the lower portions 41 of the tracks 39 up onto the upper portions 40 thereof. That is, when the box 270 is lifted upwardly as shown in Fig. 4, the rollers 138 rest against the forward faces of the upper track sections 40 which, as clearly shown in Fig. 2, are positioned some distance in advance of the lower sections 41. It is of course also understood that whenever the conveyer 27 is lifted, both front and rear tuckers move with this conveyer because they are mounted directly on the conveyer frame, as described hereinabove.

When the tucker plates 116 and 141 are thus deflected inwardly they engage any fruit extending outwardly over box sides and move this inward so that this fruit may be pushed downwardly into the box without cutting it on the upper edges of the box sides.

During upward movement of the conveyer 27 the rack and pinion mechanisms 220 rotate the end tuckers 207 so that when these tucker rollers contact fruit as shown in Fig. 13 this fruit is tucked inwardly as shown in Fig. 14, while the box ends 276 travel upwardly until they come in contact with the rollers 207. At this time the bevelled end edges 118 of the front side tucker and corresponding portions 143 of the rear side tucker engage the narrow end portions 235 of the rollers 207 so as to force the tucker plates 111 and 140 downwardly against the upper edges of opposite sides of the box 270. Further movement upward of the conveyer 27 brings the bevelled end edges of the side tuckers forcibly against the rollers 207 so as to swing these outwardly into the position in which these tuckers are shown in Fig. 15. Here the tucker rollers 207 rest against the stops 188 so that there is just enough space between the tucker rollers to receive a standard orange box 270. This positively positions the box 270 so that the box ends 273 will properly receive the nails when it comes time to nail the lid 250 to the box.

If it is desired, the side tuckers need not be arranged to contact with the end tuckers to move this out from between the box and the lid, as this may be accomplished by the rotation of the end tuckers by the rack and pinion mechanisms 220 when the roller tuckers 207 contact with the upper edges 275 of the box ends 276.

The inward movement of the front and rear side tuckers pushes the side tucker face plates 116 and 141 inwardly over the side 274 of the box 270 so as to tuck the fruit in between the lid 250 and the box sides to prevent this being crushed when the lid is applied as shown in Figs. 3, 4, 9, and 15.

As the conveyer 27 approaches its upwardmost position the box 270 crowds the cleats 260 of the lid 250 against lower faces of the nailing chucks 175. The bevelled faces 187 of the lid compressing bars 186 compress the lid 250 into an upward bowed position regardless of the action of the fruit which also tends to bow the lid in this manner. As the tucker rollers 207 swing outwardly into the positions in which they are shown in Fig. 15, they contact the legs 193 of the guides 191 so as to swing these guides out of the way as shown in this figure.

The pressure of the box ends 276 against the lid 250 is sufficient when added to the weight of the box 270 and its contents, to force the conveyer rollers 68 downwardly and stretch the springs 61 until the ends 273 of the box rest upon the anvil bars 49 and 50.

The rollers 68 of course are mounted on the frame 63 so that the latter moves downwardly relative to the conveyer framework 45 as the conveyer 27 reaches its upwardmost position. This causes a relative movement between the depressing finger 91 and the box stop mechanism arm 73 so as to depress this arm and bring the stop 76 formed thereon below the level of the bottom of the box 270. This permits the spring 78 to retract the arm 73 to a point where the stop 76 is beneath the box. Thus when the box is again lowered it is free to be moved over the stop and, off the conveyer 27 and onto a suitable discharge conveyer (not shown) disposed to receive it.

A mechanism (not shown) controlling operation of the nailing plungers 176 is now actuated by the operator so that these plungers simultaneously reciprocate to nail each end of the lid 250 onto its respective box end 276. The mechanism thus controlling the nailing plungers 176 is connected to controls for the cylinder 71 so that as soon as the nailing function is accomplished the oil in the lower end of the cylinder 71 is permitted to exhaust this causing the conveyer 27 to move downwardly and the lidded box 270 to be discharged therefrom.

What I claim is:

1. In a lidding device, the combination of: means for applying a lid to a box in the proper position for securing said lid to said box; means disposed between end portions of said lid and said box while said box and said lid are being brought together for tucking fruit or the like heaped up on said box, inwardly from the ends between said lid and said box; and means for causing said tucking means to rotate to tuck said fruit without injury thereto.

2. A combination as in claim 1 in which said tucking means also supports said lid in position for application to said box.

3. In a lidding device, the combination of: means for applying a lid to a box in the proper position for securing said lid to said box; a pair of cylindrical tuckers, one extending between each end of said box and said lid, for tucking fruit or the like heaped up on said box, inwardly between said lid and said box; means for supporting said tuckers in said positions while said box and lid are being brought together; and means for rotating said tuckers to force said fruit inwardly from beneath said tuckers.

4. In a lidding device, the combination of: means for applying a lid to a box in the proper position for securing said lid to said box; a pair of cylindrical tuckers, one extending between each end of said box and said lid, for tucking fruit or the like heaped up on said box, inwardly between said lid and said box; means for supporting said tuckers in said positions while said box and lid are being brought together; means for rotating said tuckers to force said fruit inwardly from beneath said tuckers; and means causing said tuckers to move away from over the upper faces of the box ends just before said lid is applied to said box in position for securing thereto.

5. In a lidding device, the combination of: means for supporting a filled box; means for applying a lid to said box in proper position for securing thereto; end fruit tucking means; means for bringing said box supporting means and said lid applying means together; and rack and pinion means actuated by said last aforementioned means for operating said fruit tucking means.

6. In a lidding device, the combination of: means for supporting a filled box; lid end supports comprising fruit tuckers for supporting a lid above said box; and arms upon which said tuckers are mounted, an opposite pair of said arms being formed to receive a lid horizontally therebetween into proper position on said tuckers.

7. A combination as in claim 6 including lid side stops for aligning said lid sideways with said box; and end stops for aligning said lid endwise with said box, one of said ends stops being yieldable.

8. In a lidding device, the combination of: means for supporting a filled box; means for applying a lid to said box in proper position for securing thereto; end fruit tucking means; means for bringing said box supporting means and said lid applying means together; side fruit tuckers mounted on said box support means and disposed along upper edges of said box sides; and means on said side tuckers for operating said end tuckers.

9. In a box lidding device the combination of: means for receiving a lid in position for applying it to a box; means for conveying a box horizontally beneath said lid receiving means and stopping it with said lid superimposed thereabove; means for bringing said lid receiving means and said conveying means together to apply said lid to said box in position for nailing it thereto; and a roller provided on said lid receiving means for tucking fruit and the like inward from an edge of said box to prevent said fruit being crushed between said box and said lid.

10. In a box lidding device the combination of: means for receiving a lid in position for applying it to a box; means for conveying a box horizontally beneath said lid receiving means and stopping it with said lid superimposed thereabove; means for bringing said lid receiving means and said conveying means together to apply said lid to said box in position for nailing it thereto; a shaft journalled on said lid receiving means; arm means provided on said shaft; and a tucker roller journalled on said arm means for tucking fruit and the like inward from an edge of said box to prevent said fruit being crushed between said box and said lid.

11. In a box lidding device the combination of: means for receiving a lid in position for applying it to a box; means for conveying a box horizontally beneath said lid receiving means and stopping it with said lid superimposed thereabove; means for bringing said lid receiving means and said conveying means together to apply said lid to said box in position for nailing it thereto; means provided on said lid receiving means for tucking fruit and the like inward from an edge of said box to prevent said fruit being crushed between said box and said lid; and rack and pinion means actuated by said lid applying means for operating said tucking means.

12. In combination: a box support; a stationary lid applying means mounted over said support; means for lifting said support to bring a box into engagement with said lid applying means and permit a lid to be applied to said box; and tucking means provided on said lid applying means and actuated by said lifting movement to move an overflow of the contents of said box inward between said lid and said box before the consummation of said lid applying operation.

13. A combination as in claim 12 in which said tuckers are pivotally mounted over end portions of said box so as to swing outward from between said box and said lid just before the consummation of said lid applying operation.

14. In combination: box support means; lid applying means mounted above said support means; means for moving one of the aforesaid means towards the other to apply a lid to a box on said support means; side flushers mounted on said box support and actuated by the aforesaid movement to move an overflow of the contents of said box inward between said lid and said box before the consummation of said lid applying operation; and means for yieldably holding at least one of said flushers against said box while said flushers are in flushing position.

15. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; gathering means on said presser head, said gathering means overlying a vertical wall of said box, as well as overlying overflow fruit or the like, extending outwardly over said wall so that said relative vertical movement results in contact between said gathering means and said overflow fruit or the like and the shifting of the latter inwardly from over said wall; and means permitting said gathering means to shift outwardly away from over said wall following said gathering operation.

16. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; and gathering means rotatably mounted on said presser head, said gathering means overlying a vertical wall of said box, as well as overlying overflow fruit or the like, extending outwardly over said wall so that said relative vertical movement results in contact between said gathering means and said overflow fruit or the like and the shifting of the latter inwardly from over said wall.

17. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; gathering means overlying a vertical wall of said box, as well as overlying overflow fruit or the like, extending outwardly over said wall so that said relative vertical movement results in contact between said gathering means and said overflow fruit or the like and the shifting of the latter inwardly from over said wall; and means for positively rotating said gathering means during said gathering operation.

18. In a device for applying lids to boxes overfilled with fresh fruit or the like the combination of means for supporting such a box; a presser head disposed over said means; means causing relative vertical movement between said supporting means and said presser head to press a lid onto said box with the ends of said lid engaging the ends of said box; and means extending beneath an edge of a lid for supporting said edge of said lid, said means, when so disposed, overlying a vertical wall of said box, as well as overlying overflow fruit or the like, extending outwardly over said wall so that said relative vertical movement results in contact between said lid edge supporting means and said overflow fruit or the like and the shifting of the latter inwardly from over said wall.

19. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; and means on said presser head and extending inwardly beneath opposite edges of a lid to support said lid, said means when so disposed overlying opposite vertical walls of said box, as well as overlying overflow fruit or the like, extending outwardly over said walls so that said relative vertical movement results in contact between said lid edge supporting means and said overflow fruit or the like and the shifting of the latter inwardly from over said walls.

20. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; and a pair of lid supporting members provided on said presser head and extending inwardly beneath opposite ends of a lid to support the latter on said presser head, said lid supporting members overlying the ends of said box, as well as overlying overflow fruit or the like, extending outwardly over said ends so that said relative vertical movement results in contact between said members and said overflow fruit or the like and the shifting of the latter inwardly from over said ends of said box; and means permitting said members to shift outwardly away from over said box ends following said gathering operation.

21. In a device for applying lids to boxes overfilled with fresh fruit or the like the combination of: means for supporting such a box; a presser head disposed over said means; means causing relative vertical movement between said supporting means and said presser head to press a lid onto said box with the ends of said lid engaging the ends of said box; and a roller on said presser head, said roller overlying a vertical wall of said box, as well as overlying overflow fruit or the like, extending outwardly over said wall so that said relative vertical movement results in a contact between said roller and said overflow fruit or the like and the shifting of the latter inwardly from over said wall.

22. In a device for packaging fruit or the like, the combination of: a table for supporting a box overfilled with fruit so that certain edge pieces of the upper layer of said fruit overlie a vertical wall of said box; a rotatable gathering member mounted to overlie said vertical wall and said edge pieces of fruit; and means for causing relative vertical movement between said box supporting table and said gathering member to bring the latter and said edge pieces of fruit into contact and to shift the latter inwardly from over said vertical wall.

23. In a device for packaging fruit or the like, the combination of: a table for supporting a box overfilled with fruit so that certain edge pieces of the upper layer of said fruit overlie a vertical wall of said box; a rotatable gathering member mounted to overlie said vertical wall and said edge pieces of fruit; means for causing relative vertical movement between said box supporting table and said gathering member to bring the latter and said edge pieces of fruit into contact and to shift the latter inwardly from over said vertical wall; and means actuated by said relative vertical movement to cause said member to be moved outwardly from over said wall following said fruit shifting operation.

HALE PAXTON.